No. 660,306. Patented Oct. 23, 1900.
A. B. OLMSTED.
MUD GUARD FOR BICYCLES.
(Application filed June 7, 1900.)

(No Model.)

Witnesses
F. L. Ourand
F. G. Radelfinger

Inventor:
Aaron B. Olmsted.
By Louis Bagger & Co.
Attorneys.

United States Patent Office.

AARON B. OLMSTED, OF ONEIDA CASTLE, NEW YORK.

MUD-GUARD FOR BICYCLES.

SPECIFICATION forming part of Letters Patent No. 660,306, dated October 23, 1900.

Application filed June 7, 1900. Serial No. 19,434. (No model.)

*To all whom it may concern:*

Be it known that I, AARON B. OLMSTED, a citizen of the United States, residing at Oneida Castle, in the county of Oneida and State of New York, have invented new and useful Improvements in Mud-Guards for Bicycles, of which the following is a specification.

My invention relates to mud-guards or cleaners for bicycles; and the object of the same is to provide a simple and efficient cleaner which may be attached to the axles or forks of any bicycle and render satisfactory service.

My cleaner is so constructed that the parts exposed to wear may be easily removed and new ones substituted. This substitution can be made by any one and at a very slight cost. These advantages are accomplished by a novel and simple construction, to be hereinafter fully described and claimed.

Figure 1:
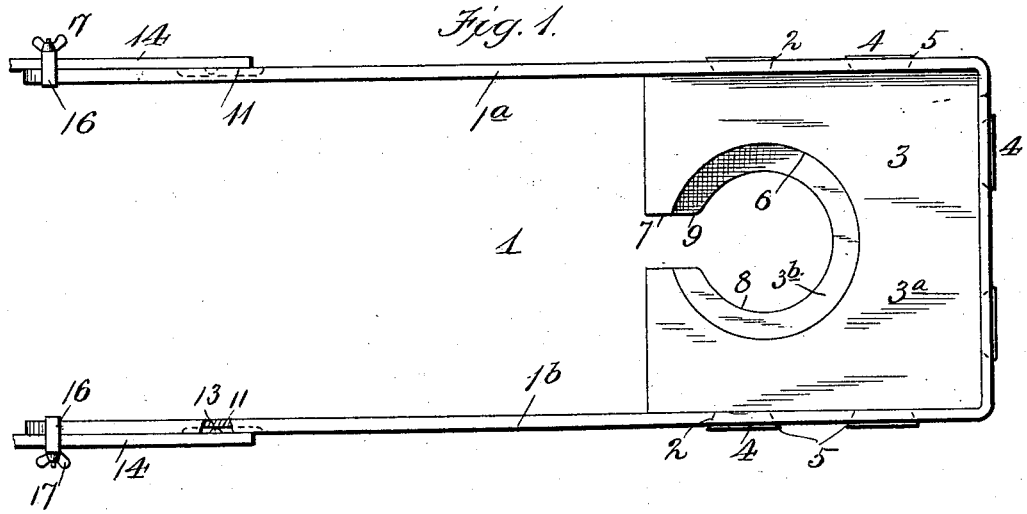
Figure 2:
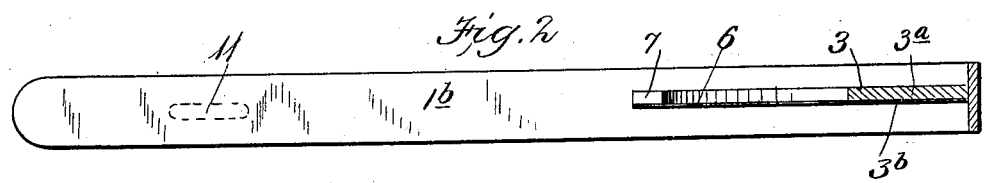
Figure 3:
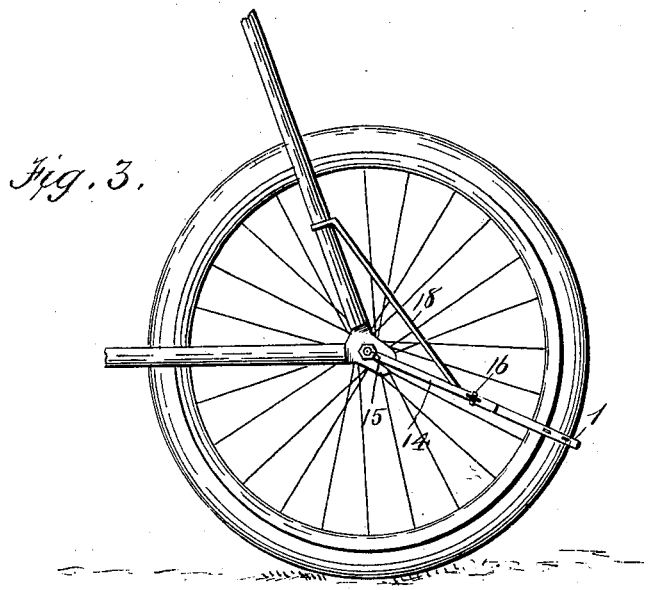

In the drawings which accompany this specification and of which they form a part, Figure 1 is a plan view of my improved cleaner. Fig. 2 is a longitudinal section of the same. Fig. 3 shows my improved cleaner attached to the rear axle of a bicycle.

Like numerals of reference denote like parts wherever they occur in the drawings.

The numeral 1 designates the yoke or supporting-frame of my cleaner, having transverse perforations 2. These perforations serve as attachments for a membrane 3, which contacts with the bicycle-tire. I may use different materials for this purpose—such as rubber, leather, asbestos, &c.; but in general I prefer to use rubber. The membrane 3 is composed of two distinct portions, a thick and a thin one, $3^a$ and $3^b$, respectively, secured together by glue or otherwise. Dovetail lugs 4 are formed integral with said membrane 3 and have points 5. To insert these dovetails 4 into the perforations 3, the points 5 are grasped by a pair of pincers inserted into the perforation, the points 5 are pressed together, and the lug 3 pulled through and released. The elastic force of the membrane will then hold it firmly in the frame. The layer $3^a$ is made of stiff rubber and has a circular aperture 6 formed therein, which is connected to the boundary by a cross-cut 7. The layer $3^b$, which is of thinner material, has formed therein a circular aperture 8, slightly smaller than the aperture 6 and designed to fit snugly the tire of the wheel. A cross-cut 9 connects the aperture 8 with the boundary, and thus enables the tire to be fitted into the apertures 6 and 8. The edges of the aperture 8 are designed to follow the tire closely, and thereby scrape off the water from the wheel, while the heavy one, 6, rids the wheel of mud.

It will be understood that the thick membrane $3^a$, while flexible, is stiff enough to maintain its normal position except in case of an unusual accumulation of stiff mud. Then it will be bent aside without being broken or locking the wheel of the bicycle. The thin membrane $3^b$ is so flexible, however, that it is pushed aside by any accumulation of mud.

Arms $1^a$ and $1^b$ of the frame 1 have longitudinal grooves 11, which are adapted to fit lugs 13, formed on arms 14, which are secured at 15 to the axle of the wheel or to the frame. Clips 16, provided with thumb-screws 17, clamp the arms 14 to the arms $1^a$ and $1^b$. The combination of the grooves 11, the lugs 13, and the clips 16 renders adjustments for different positions of the guard and different sizes of wheels possible and very simple. Brace-rods 18 may also be added to add rigidity to the guard.

My device may be placed on any bicycle by simply removing the nuts on both ends of the axle and placing the apertures 15 over the ends of the axle and then replacing the nuts. The brace-rods 18 can then be attached. Adjustments are made in the manner already specified.

Having thus described my invention, what I claim as new, and wish to secure by Letters Patent, is—

In a cleaner for bicycles, the combination, substantially as described, of a thick stiff flexible membrane provided with means for securing it in a frame and having an aperture therein adapted to fit the tire with a small intervening space, a thin flexible membrane secured to said thick membrane and having an aperture therein of smaller size than the aperture in said thick membrane and adapted to fit more snugly the tire, and
5 said frame which is provided with means for securing it to a bicycle.

In testimony whereof I have hereunto set my hand in presence of two subscribing witnesses.

AARON B. OLMSTED.

Witnesses:
BARNEY KETNARD,
DENISON RIGHTMYER.